United States Patent [19] [11] 3,963,012
Harned [45] June 15, 1976

[54] ENGINE WITH VAPOR HEAT TRANSFER CAPSULE FOR INTAKE MIXTURE HEATING
[75] Inventor: John L. Harned, Grosse Pointe Woods, Mich.
[73] Assignee: General Motors Corporation, Detroit, Mich.
[22] Filed: June 30, 1975
[21] Appl. No.: 591,273

[52] U.S. Cl. .................. 123/122 AC; 123/122 AB; 165/52
[51] Int. Cl.² ........................................ F02M 31/00
[58] Field of Search... 123/122 AC, 122 H, 122 AB, 123/133; 165/52, 105; 261/141

[56] References Cited
UNITED STATES PATENTS
1,854,298  4/1932  Godward..................... 123/122 AC
3,886,918  6/1975  Cole........................... 123/122 AC Primary Examiner—Charles J. Myhre
Assistant Examiner—R. H. Lazarus
Attorney, Agent, or Firm—Robert J. Outland

[57] ABSTRACT

An internal combustion engine is provided with a vapor heat transfer capsule mounted between the inlet and exhaust manifolds, below the carburetor, to transfer exhaust heat to the intake manifold air-fuel mixture. The heat transfer capsule includes boiler and condenser sections separated by a regulator plate that includes a vapor flow directing nozzle and a plurality of capillary passages for the return of liquid condensate. The regulator plate is insulated from the exhaust manifold, but is in heat exchange relation with the intake manifold to provide a path for the transfer of excess heat out of the condenser section.

3 Claims, 4 Drawing Figures

ENGINE WITH VAPOR HEAT TRANSFER CAPSULE FOR INTAKE MIXTURE HEATING

FIELD OF THE INVENTION

This invention relates to intake mixture heating systems for internal combustion engines and more particularly to systems wherein heat is transferred from gases in the exhaust manifold to mixtures of air and fuel in the intake manifold through a heat transfer capsule mounted between the manifolds and containing a vaporizable liquid.

BACKGROUND OF THE INVENTION

It is known in the art relating to spark ignited gasoline engines, particularly those for automotive use, to provide means for heating the intake air-fuel mixture with heat transferred from the engine exhaust gases. Among the arrangements proposed and utilized for this purpose are included those having juxtaposed intake and exhaust manifolds with interrelated passages wherein exhaust gases are directed against a plate or wall to which the intake manifold mixture is exposed, preferably at a point below the manifold inlet and the throat of the associated carburetor. The heating of the plate or wall by the exhaust gases vaporizes fuel droplets impinging on the wall or plate and heats the adjacent air-fuel mixture. To control systems of this type, thermostatic or time controlled valves are often used to direct exhaust gases toward or away from the plate or wall to provide maximum exhaust heat during engine warm up and afterwards limit the amount of heat transferred to some lesser amount.

To overcome some of the problems inherent in mechanical valve systems, it has been proposed to use two-phase thermosyphons, more recently known as heat pipes, in which a vaporizable fluid is utilized to transfer heat from the exhaust gases to a fuel vaporizing chamber. However, some of the systems proposed have involved relatively complex arrangements for vaporizing the fuel in advance of mixing with the main air charge and would appear not to obtain the desired advantages of simplicity and practicality along with the fast warm up and automatic temperature regulation desired of such systems.

SUMMARY OF THE INVENTION

The present invention involves novel arrangements for a vapor heat transfer capsule for use between the intake and exhaust manifolds of internal combustion engines and adapted to provide fast warm up and transfer of heat from the exhaust gases to the intake mixture without undue complexity and with no moving parts, other than the heat transfer fluid, itself.

The invention proposes a novel heat transfer capsule mounted between opposed flanges of the intake and exhaust manifolds of an engine and having a lower boiler section and an upper condenser section separated by a regulator plate. This plate contains a vapor directing nozzle and capillary return passages which control the rate of condensate flow from the condenser back to the boiler. In addition, the plate acts to conduct excess heat from the condenser section to the walls of the intake manifold to aid in controlling the temperature of a condenser wall that is exposed to liquid fuel and air-fuel mixture in the inlet manifold. The mass of the walls of both condenser and boiler sections is made small to aid in quick warm up and the amount of liquid contained in the boiler is also minimized for the same purpose.

These and other features and advantages of the inventive arrangement will be more fully understood from the following description of a preferred embodiment taken together with the accompanying drawing.

GENERAL DESCRIPTION

Figure 1:
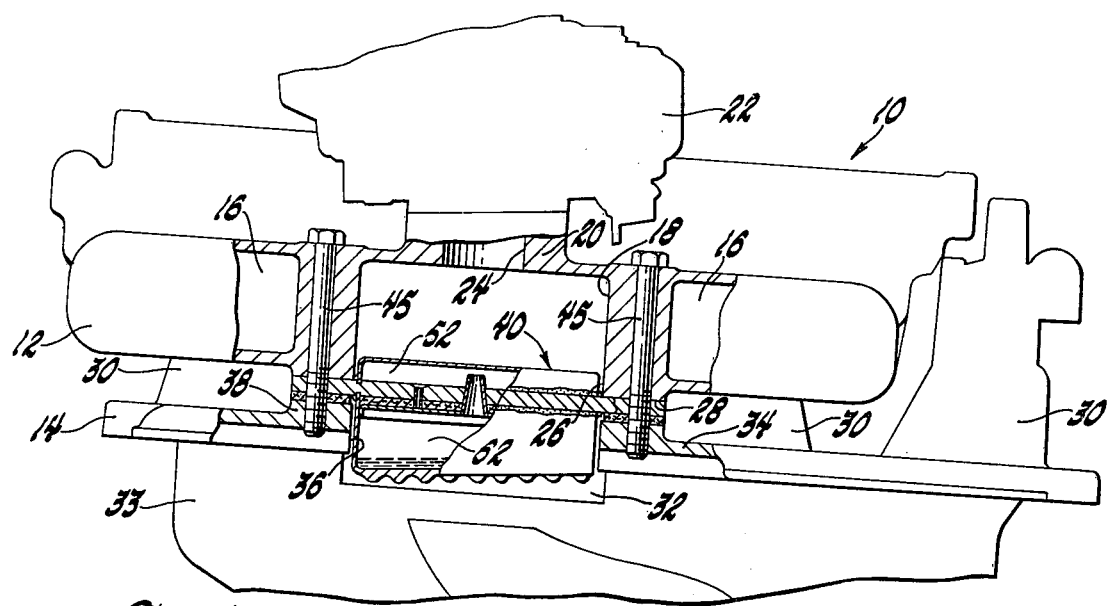
FIG. 1 is a side view, partially in section of an internal combustion engine illustrating the intake and exhaust manifold arrangements and the installation of a vapor heat transfer capsule formed according to the invention.

Referring more specifically to the drawing, there is shown an internal combustion engine of the spark ignition gasoline fueled type generally indicated by numeral 10. Although not shown in detail, the engine may be considered as of the well-known four cylinder in-line type. Engine 10 is provided with an intake manifold 12 and an exhaust manifold 14 which are separately formed and are connected with the usual combustion chamber intake and exhaust ports, not shown.

Intake manifold 12 comprises a cast member having generally horizontal mixture distribution passages 16 connecting with a central plenum 18. Above the plenum there is a riser 20 mounting a carburetor 22. An inlet opening 24 in the riser connects with the throat, not shown, of carburetor 22 to receive air-fuel mixture therefrom for transfer to the intake manifold plenum 18. The bottom of the plenum 18 comprises a heat opening 26 surrounded by a flange 28.

The exhaust manifold 14 includes a plurality of legs 30 defining internal exhaust gas passages, not shown, which connect with the usual engine exhaust ports, not shown. The passages in the legs 30 direct the exhaust gases into a central plenum 32, defined within a main body 33 and preferably baffled internally to form a reactor for burning combustibles remaining in the exhaust gases. The plenum 32 is partially defined by an upper wall 34 that includes a heat opening 36, surrounded by an upwardly facing flange 38, opposing the flange 28 of the intake manifold.

Figure 2:
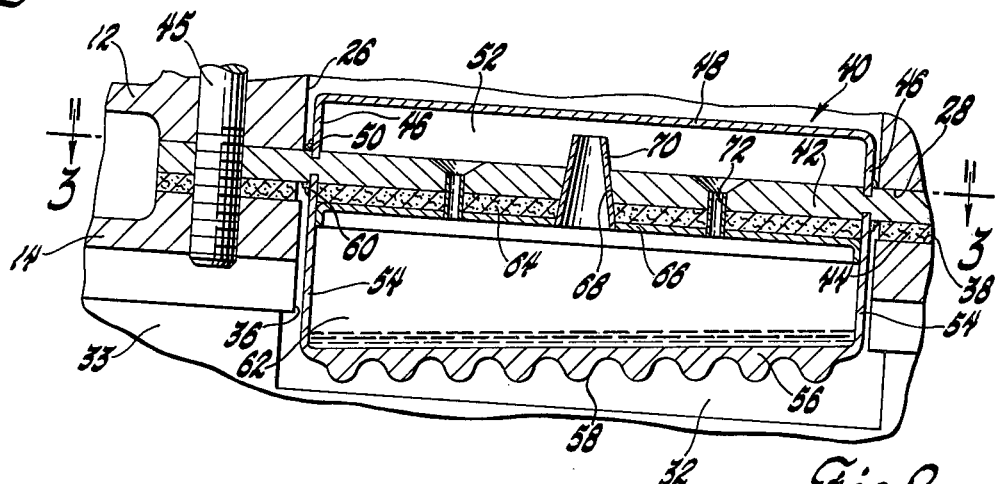
FIG. 2 is an enlarged cross-sectional view showing in detail the installation and arrangement of the capsule of FIG. 1.
Figure 3:
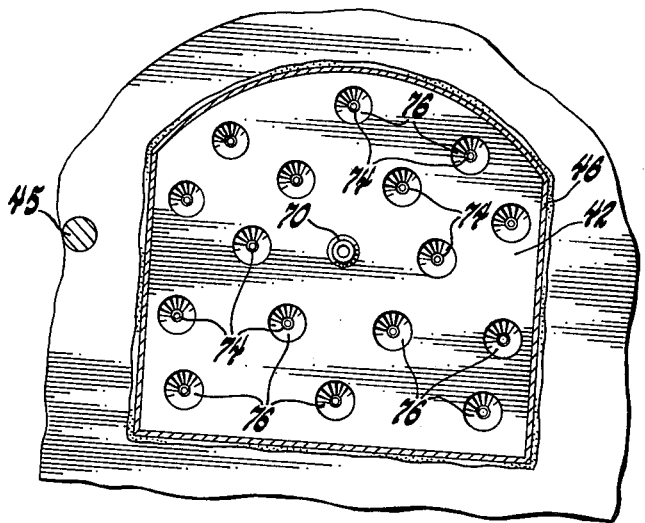
FIG. 3 is a cross-sectional view taken in the plane indicated by the line 3—3 of FIG. 2 and looking downwardly on the capsule regulator plate.

Mounted within the heat openings 26, 36 and secured between the flanges 28, 38 is a vapor heat transfer capsule 40. As may be best seen in FIG. 2, capsule 40 includes a regulator plate 42, formed of relatively thick heat conducting metal and clamped between the flanges 28 and 38 with a gasket 44 of heat insulating material disposed between the plate 42 and a flange 38 of the exhaust manifold. Bolts 45 are provided to retain the intake and exhaust manifolds in assembly with the regulator plate and gasket.

On the upper side of the regulator plate 42 there is secured an inverted cup-shaped element formed of low mass, thin walled, heat conducting material such as, for example, stainless steel sheet and having side and top walls 46, 48 respectively. The side walls 46 are sealingly secured to the regulator plate, as by welding at 50, the mass of the weld and the thickness of the wall itself being kept small to minimize heat transfer directly between the side walls 46 and the plate 42. Walls 46 extend adjacent to, but spaced from, the sides of the heat opening 26 and upper wall 48 extends across and substantially closes the bottom of this opening, thus constituting a hot plate 48 on the bottom of the mixture plenum 18 for the collection of liquid fuel droplets entering the intake manifold from the carburetor. Between the plates 48 and 42 and within the walls 46 there is defined a condenser chamber 52.

Attached to the bottom of the regulator plate, below the hot plate 48, there is an upright cup-shaped member having relatively thin side walls 54 and a somewhat thicker bottom wall 56 which has an irregular or finned lower surface 58. Wall 56 constitutes a boiler wall extending into the plenum 32 of the exhaust manifold and exposed to the exhaust gases for receiving heat therefrom. The side walls 54 extend close to, but are spaced from the sides of the opening 36 in the exhaust manifold and are welded, as at 60, to the bottom of the regulator plate, forming therewith a boiler or evaporator chamber 62. A layer or sheet of heat insulating material 64 covers the lower surface of the regulator plate within the walls 54 to prevent the direct transfer of heat from vapor in the boiler chamber to the regulator plate 42. A protective sheet metal plate 66 covers the lower surface of the insulation 64 to prevent its penetration by the vapor.

In the approximate center of the regulator plate and extending through the plates 42, 66 and insulation 64 is a nozzle opening 68, containing an upwardly converging nozzle 70 that extends upwardly from the regulator plate 42 toward the hot plate 48 to direct vapor rising therethrough toward the hot plate and provide a dam for preventing the return of condensate downwardly through the nozzle opening. While only one nozzle and nozzle opening is shown, it would be possible to provide more, if desired.

Figure 4:
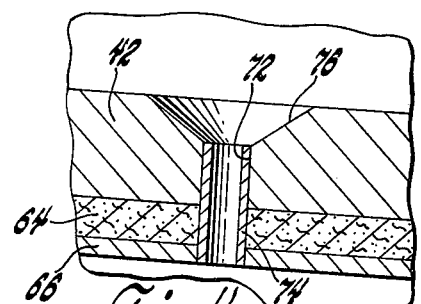
FIG. 4 is an enlarged cross-sectional view illustrating the structure of one of the capillary passages in the regulator plate.

In addition to the nozzle opening, there also extends through the regulator plate 42 insulation 44 and protective plate 66 a plurality of small capillary openings 72. These openings, as best shown in FIG. 4, are provided with protective sleeves forming capillary ducts 74 and open upwardly into bevelled recesses 76 formed in the upper surface of the regulator plate 42.

To complete the assembly, the boiler chamber is provided with a limited quantity of vaporizable liquid such as, for example, water which covers the bottom wall 56 of the boiler chamber, the latter being preferably arranged to be level as the engine is installed in a vehicle so that the heat transfer fluid is substantially equally distributed over the inner surface of the bottom wall 56.

OPERATION

When the engine is started from a cold condition, exhaust gases passing through the plenum 32 will transfer heat through the fins 58 and wall 56 to the liquid within the boiler chamber. If the mass of the walls 54, 56 and the amount of fluid within the chamber are minimized, the heat will shortly cause the fluid to boil, causing vapor to form within the boiler chamber and increase the pressure therein. The vapor expands, rises and is forced through the nozzle 70, which directs it against the lower surface of the (cold) hot plate 48, where it condenses, transferring heat to the hot plate.

The passage of air-fuel mixture from the carburetor downwardly through opening 24 to the intake manifold plenum 18, causes air-fuel mixture and liquid fuel droplets therein to impinge upon the upper surface of the hot plate, tending to cool this surface. However, the heat transmitted from the vapor condensing on the lower surface of the hot plate heats the plate and causes the liquid to be vaporized and the adjacent air-fuel mixture to be heated as it passes through the plenum.

After condensing on the lower surface of the hot plate, the heat transfer liquid falls into the upper surface of the regulator plate where it collects in the bevelled recesses 76 leading to the capillary ducts formed by sleeve 74. The liquid moves downwardly through these capillary ducts and is thus returned to the boiler chamber below, where it drops into the lower wall 56 for revaporization.

As the engine warms up, it is desirable to limit the amount of heat transferred from the exhaust gases to the intake air-fuel mixture. This is accomplished in two ways. One way is by control of the size and number of capillary ducts provided in the regulator plate. Limiting the size or the number of ducts limits the rate at which liquid heat transfer fluid may be returned to the boiler below and, thus, controls the rate at which vapor heat transfer may occur. When this controlled condition is reached, the major portion of the vaporizng fluid is collected along the upper surface of the regulator plate, with droplets falling from the capillary ducts being vaporized almost upon contact with the lower wall 56.

The second method of controlling heat transfer through the capsule 40 is the provision for the transfer of excess heat from the fluid in the condenser chamber 52, through the regulator plate, directly to the walls of the intake manifold 12 through contact with the flange 28. In order that a substantial amount of heat may be transferred in this manner, the regulator plate is made relatively thick to provide a path for substantial heat flow. In this way, the temperature of the hot plate is controlled so that it will not reach a level that would cause coking of the fuel impinging on its upper surface.

It should be understood that whatever the vaporizable fluid used for transferring heat within the capsule, its boiling and condensing temperature must be in a range between the exhaust gas temperature and the desired temperature of the inlet air-fuel mixture. The boiling temperature will, of course, vary somewhat during operation, since as the capsule becomes pressurized by vaporization of liquid, the boiling temperature will normally rise.

Because of the design of the capsule to provide a maximum limit to the flow of heat therethrough, the arrangement automatically controls the transfer of heat to the engine intake air-fuel mixture such that the mixture is heated to a higher temperature when the engine is running at very low speeds, and the rate of mixture flow is relatively slow. As the throttle is opened and the engine speed and mixture flow increase, the heat transferred to the capsule is distributed over an increasingly greater amount of air-fuel mixture, and thus the temperature of the mixture decreases. Thus, when the engine is running near maximum power, the heating effect of the capsule is relatively small and does little to limit the maximum output of the engine. On the contrary, when the engine is running at nearly closed throttle, the capsule heats the mixture significantly, thereby aiding the proper distribution of mixture to the various cylinders and improving combustion in the engine combustion chambers.

While the invention has been disclosed by reference to a specific embodiment chosen for purposes of illustration, it should be understood that numerous changes could be made without departing from the spirit and scope of the inventive concepts disclosed. Accordingly, the invention is intended to be limited only by the language of the following claims.

What is claimed is:

1. A vapor heat transfer capsule in combination with an internal combustion engine to transfer heat from gases in the exhaust manifold to mixture in the intake manifold, said capsule comprising
    a heat conducting plate secured between opposed flanges of the intake and exhaust manifolds of said engine,
    first enclosure means having bottom and side walls sealingly secured to the bottom of said plate and forming therewith a boiler chamber beneath the plate and adapted to contain a quantity of vaporizable fluid,
    second enclosure means having top and side walls sealingly secured to the top of said plate and defining a condenser chamber above said boiler chamber and separated therefrom by said plate, said top and side walls being formed of thin walled heat conductive material of relatively low mass,
    nozzle means extending through and above said plate and defining a passage for directing vapor passing from the boiler chamber into the condenser chamber against the upper wall of said second enclosure means, said nozzle means further defining a dam preventing condensate collected on said plate upper surface from returning to the boiler chamber through said nozzle passage,
    a plurality of small capillary passages extending through said plate to connect said condenser and boiler chambers, said capillary passages acting to return condensate collected on said plate upper surface to said boiler chamber, and
    a limited quantity of vaporizable fluid sealed within said chambers, said fluid having a predetermined boiling temperature between the desired inlet fuel mixture temperature and the normal exhaust gas temperatures and below the temperature at which substantial breakdown of the fuel in the intake manifold mixture is likely to occur.

2. A vapor heat transfer capsule in combination with an internal combustion engine to transfer heat from gases in the exhaust manifold to mixture in the intake manifold, said capsule comprising
    a heat conducting plate secured between opposed flanges of the intake and exhaust manifolds of said engine,
    first enclosure means having bottom and side walls sealingly secured to the bottom of said plate and forming therewith a boiler chamber beneath the plate and adapted to contain a quantity of vaporizable fluid,
    second enclosure means having top and side walls sealingly secured to the top of said plate and defining a condenser chamber above said boiler chamber and separated therefrom by said plate, said top and side walls being formed of thin walled heat conductive material of relatively low mass,
    heat insulating means covering the portion of said plate bottom residing within said boiler chamber,
    nozzle means extending through and above said plate and defining a passage for directing vapor passing from the boiler chamber into the condenser chamber against the upper wall of said second enclosure means, said nozzle means further defining a dam preventing condensate collected on said plate upper surface from returning to the boiler chamber through said nozzle passage,
    a plurality of small capillary passages extending through said plate and insulating means to connect said condenser and boiler chambers, said capillary passages acting to return condensate collected on said plate upper surface to said boiler chamber, the upper surface of said plate being recessed around the upper ends of said capillary passages to collect condensate at said ends for return to the boiler chamber, and
    a limited quantity of vaporizable fluid sealed within said chambers, said fluid having a predetermined boiling temperature between the desired inlet fuel mixture temperature and the normal exhaust gas temperatures and below the temperature at which substantial breakdown of the fuel in the intake manifold mixture is likely to occur.

3. The combination with an internal combustion engine of
    an intake manifold defining a mixture passage with a mixture intake opening in the top of said manifold and connecting with said passage and a heat opening in the bottom of said manifold, extending downwardly from said passage beneath said mixture intake opening,
    a carburetor mounted on said manifold so as to supply a mixture of air and fuel through said intake opening to said intake passage,
    an exhaust manifold defining an exhaust passage extending beneath said intake manifold, said exhaust manifold having a heat opening through an upper portion thereof, connecting with said exhaust passage and aligned with the heat opening of said intake manifold, said intake and exhaust manifolds having opposing flanges surrounding their respective heat openings,
    a vapor heat capsule retained between said manifold flanges and in their respective heat openings, said capsule comprising a mounting and regulating plate clamped between said flanges and separating said inlet and exhaust passages,
    lower enclosure means sealingly secured to said plate and defining a boiler chamber beneath said plate having one wall exposed to hot exhaust gases in said exhaust passage,
    upper enclosure means sealingly secured to said plate and defining a condenser chamber above said plate having one wall exposed to mixture of air and fuel passing through said intake passage,
    said regulator plate including a plurality of openings, at least one of said openings containing nozzle means extending above said plate and acting to direct vaporized fluid from said boiler chamber against the upper wall of said condenser chamber, others of said openings comprising small capillary passages for returning condensed liquid from the upper surface of said regulator plate to said boiler chamber, and
    a limited mass of vaporizable fluid sealed within said chambers, said fluid having a boiling temperature between the normal operating exhaust gas and inlet mixture temperatures and below the coking temperature of fuel in the inlet mixture, said capillary passages being selected in size and number to limit the return flow of condensate to the boiler chamber to a desired maximum.

* * * * *